US009549221B2

(12) United States Patent
Into

(10) Patent No.: US 9,549,221 B2
(45) Date of Patent: Jan. 17, 2017

(54) SIGNAL SWITCHING APPARATUS AND METHOD FOR CONTROLLING OPERATION THEREOF

(71) Applicant: Sony Corporation, Tokyo (JP)

(72) Inventor: Shozo Into, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/549,752

(22) Filed: Nov. 21, 2014

(65) Prior Publication Data

US 2015/0189364 A1 Jul. 2, 2015

(30) Foreign Application Priority Data

Dec. 26, 2013 (JP) ................................ 2013-269868

(51) Int. Cl.

| | |
|---|---|
| ***G06F 3/00*** | (2006.01) |
| ***H04N 21/485*** | (2011.01) |
| ***H04N 7/10*** | (2006.01) |
| *H04N 7/08* | (2006.01) |
| *H04N 7/015* | (2006.01) |

(52) U.S. Cl.

CPC .......... *H04N 21/4854* (2013.01); *H04N 7/104* (2013.01); *H04N 7/015* (2013.01); *H04N 7/08* (2013.01)

(58) Field of Classification Search

CPC ...................... H04N 21/42607; H04N 21/4854

USPC ........................................................... 725/37

See application file for complete search history.

(56) References Cited

U.S. PATENT DOCUMENTS

| | | | | |
|---|---|---|---|---|
| 5,623,377 | A * | 4/1997 | Behrens et al. | 360/65 |
| 7,822,119 | B2 * | 10/2010 | Boon et al. | 375/240.12 |
| 7,830,959 | B2 * | 11/2010 | Park et al. | 375/240.12 |
| 2003/0123557 | A1 * | 7/2003 | De With et al. | 375/240.27 |
| 2003/0159139 | A1 * | 8/2003 | Candelore et al. | 725/25 |
| 2004/0003178 | A1 * | 1/2004 | Magoshi | 711/137 |
| 2004/0010614 | A1 * | 1/2004 | Mukherjee et al. | 709/231 |
| 2004/0022543 | A1 * | 2/2004 | Hosking et al. | 398/135 |

(Continued)

FOREIGN PATENT DOCUMENTS

| | | |
|---|---|---|
| JP | S60-31364 | 2/1985 |
| JP | H1-240083 | 9/1989 |

(Continued)

OTHER PUBLICATIONS

Lift Forums Administrator. Sony's New PVM-X300 Professional Monitor Offers Powerful Support of 4K Monitoring in the Field. Lift Gamma Gain. Oct. 30, 2012.*

(Continued)

*Primary Examiner* — Nasser Goodarzi
*Assistant Examiner* — Michael B Pierorazio
(74) *Attorney, Agent, or Firm* — Oblon, McClelland, Maier & Neustadt, L.L.P.

(57) ABSTRACT

A signal switching apparatus includes multiple video image processing units, a controller configured to control operation of the video image processing units, and a graphical user interface (GUI) configured to receive input of a selection between an HD mode and a quartering-4K mode which are operation modes of the video image processing units. The controller controls the video image processing units so that the video image processing units operate in the HD mode or quartering-4K mode, on the basis of a selection inputted to the GUI.

7 Claims, 16 Drawing Sheets

(56) References Cited

U.S. PATENT DOCUMENTS

2005/0219253 A1* 10/2005 Piazza et al. ................. 345/557
2007/0065139 A1 3/2007 Ishii
2007/0101370 A1* 5/2007 Calderwood ................... 725/47
2007/0140666 A1 6/2007 Higashi et al.
2008/0031329 A1* 2/2008 Iwata et al. .............. 375/240.12
2008/0094419 A1* 4/2008 Leigh et al. .................. 345/660
2008/0123750 A1* 5/2008 Bronstein et al. ....... 375/240.24
2009/0094658 A1* 4/2009 Kobayashi .................... 725/118
2009/0100459 A1* 4/2009 Riedl et al. ..................... 725/35
2010/0091836 A1* 4/2010 Jia ........................... 375/240.01
2010/0091880 A1* 4/2010 Jia ........................... 375/240.25
2010/0098155 A1* 4/2010 Demircin et al. ....... 375/240.02
2010/0118945 A1* 5/2010 Wada et al. ............. 375/240.12
2010/0128797 A1* 5/2010 Dey ........................ 375/240.24
2010/0149412 A1 6/2010 Yamashita
2010/0195922 A1* 8/2010 Amano et al. ................ 382/233
2010/0246683 A1* 9/2010 Webb et al. ............. 375/240.16
2010/0260263 A1* 10/2010 Kotaka et al. ........... 375/240.15
2010/0321428 A1* 12/2010 Saito et al. ....................... 347/9
2011/0102683 A1* 5/2011 Josephs ......................... 348/731
2011/0134024 A1* 6/2011 Park ............................. 345/156
2011/0182523 A1* 7/2011 Kim et al. .................... 382/233
2011/0299836 A1* 12/2011 Amsterdam et al. ......... 386/295
2011/0304773 A1* 12/2011 Okumura ............... H04N 5/213 348/607
2012/0007992 A1* 1/2012 Zhou ............................. 348/206
2013/0208808 A1* 8/2013 Sasai .................. H04N 19/0089 375/240.25
2014/0119675 A1* 5/2014 Kim ...................... G06F 3/1446 382/299
2014/0125832 A1* 5/2014 Tanji ......................... G06T 1/20 348/222.1
2014/0285483 A1* 9/2014 Yamanaka ................ G06T 1/60 345/419
2015/0003525 A1* 1/2015 Sasai .................... H04N 19/176 375/240.12
2015/0124888 A1* 5/2015 Hwang ............ H04N 21/23437 375/240.25
2015/0135247 A1* 5/2015 Kitazato ............ H04N 21/4307 725/110
2015/0156557 A1* 6/2015 Kang ............... H04N 21/64738 725/131
2015/0201178 A1* 7/2015 Lakshminarayanan .................... H04N 13/0048 348/43
2015/0213776 A1* 7/2015 Sharma .................. G09G 5/005 345/520
2015/0326923 A1* 11/2015 Chung ............. H04N 21/44021 725/110

FOREIGN PATENT DOCUMENTS

| | | | |
|---|---|---|---|
| JP | H10-28237 | 1/1998 | |
| JP | 2007-88701 | 4/2007 | |
| JP | 2007-166587 | 6/2007 | |
| JP | 2009-130639 | 6/2009 | |
| JP | 2009-531957 | 9/2009 | |
| JP | 2010-109932 | 5/2010 | |
| KR | WO 2014073853 A1 * | 5/2014 | ..... H04N 21/234372 |
| KR | 20150083427 A * | 7/2015 | ..... H04N 21/234372 |
| WO | 2007/111589 | 10/2007 | |
| WO | 2016/035728 | 3/2016 | |

OTHER PUBLICATIONS

Sony. Professional Video Monitor (PVM-X300) Operating Instructions. 2012. Sony Corporation.*

Machine Translation of WO 2014073853 A1, prepared Dec. 11, 2015.*

Office Action issued Oct. 18, 2016 to Japanese patent application No. 2013-269868, with English translation.

* cited by examiner

TO MONITOR
26
25a
25b
25c
25d
24
OUTPUT SELECTOR
16
17
18
19
20
21
22
23
CASCADE MIX
15
MIXED SIGNAL SELECTOR SWITCH
14
13
12
11
KEY PROCESSING
10g
10h
10i
10j
10k
10l
10m
10n
9f
9e
9d
9c
9b
9a
6
MAIN IMAGE MIXING DEVICE
7
SUB-IMAGE MIXING DEVICE
10a TO 10f
5
5a
5b
5c
5d
5e
5f
8
INTERNAL SIGNAL GENERATOR
MAIN INTERNAL SIGNAL
SUB-INTERNAL SIGNAL 10A
12A
12B
11
3G ROUTER
M/E-1
M/E-2
M/E-3
P/P
MAIN
SUB
3G-SDI × 4
3G-SDI × 2

SIGNAL SWITCHING APPARATUS AND METHOD FOR CONTROLLING OPERATION THEREOF

CROSS REFERENCE TO RELATED APPLICATIONS

This application claims the benefit of Japanese Priority Patent Application JP 2013-269868 filed Dec. 26, 2013, the entire contents of which are incorporated herein by reference.

BACKGROUND

The present technology relates to a signal switching apparatus and a method for controlling operation thereof.

More specifically, the technology relates to a signal switching apparatus including multiple mix effect banks (M/Es), or the like.

There have been known effect switchers which can process both SD video signals and HD video signals by changing the settings (for example, see Japanese Unexamined Patent Application Publication No. 2008-131380).

SUMMARY

It is desirable to make effective use of hardware.

According to an embodiment of the present technology, a signal switching apparatus includes multiple video image processing units, a controller configured to control operation of the video image processing units, and a graphical user interface (GUI) configured to receive input of a selection between an HD mode and a quartering-4K mode which are operation modes of the video image processing units. The controller controls the video image processing units so that the video image processing units operate in the HD mode or quartering-4K mode, on the basis of a selection inputted to the GUI.

In the present technology, the GUI is configured to receive input of a selection between the HD mode and quartering-4K mode, which are operation modes of the video image processing units. The video image processing units are controlled by the controller so that the video image processing units operate in the HD mode or quartering-4K mode, on the basis of a selection inputted to the GUI.

For example, the GUI may receive input of a selection between a square division standard and a 2-sample interleave division standard which are both the quartering-4K mode. Further, while 1080P is selected as a signal format, the GUI may be allowed to receive input of a selection of the quartering-4K mode.

As seen above, in the present technology, the video image processing units are controlled so that they operate in the HD mode or quartering-4K mode, on the basis of a selection inputted to the GUI. This allows for effective use of the hardware, that is, the video image processing units.

According to another embodiment of the present technology, a signal switching apparatus includes multiple video image processing units each including a main circuit block, a sub-circuit block, and one or more keyer circuit blocks; a video, input unit, a video selection unit configured to select a predetermined video signal from among multiple video signals inputted to the video input unit and to input the predetermined video signal to the video image processing units, a video output unit configured to output video signals processed in the video image processing units, and a controller configured to control operation of the video image processing units. The controller controls the video image processing units so that the video image processing units operate in an HD mode or quartering-4K mode.

In the present technology, the signal switching apparatus includes the multiple video image processing units. Each video image processing unit includes the main circuit block, the sub-circuit block, and the one or more keyer circuit blocks. A predetermined video signal is selected from among multiple video signals inputted to the video input unit and then inputted to the video image processing units. Signals processed in the video image processing units are outputted from the video output unit. The video image processing units are controlled by the controller so that the video image processing units operate in the HD mode or quartering-4K mode.

For example, the signal switching apparatus may further include a graphic user interface (GUI) configured to receive input of a selection between the HD mode or quartering-4K mode as an operation mode of the video image processing units. The controller may control the video image processing units so that they operate in the HD mode or quartering-4K mode, on the basis of a selection inputted to the GUI. The GUI may receive input of a selection between a square division standard and a 2-sample interleave division standard which are both the quartering-4K mode.

For example, while the video image processing units operate in the HD mode, the main circuit block and sub-circuit block of each video image processing unit may process HD video frames, and while the video image processing units operate in the quartering-4K mode, the main circuit block and sub-circuit block of each video image processing unit may process quarter video frames obtained by quartering a 4K video frame.

For example, while the video image processing units operate in the quartering-4K mode, at least one of the keyer circuit blocks may be used exclusively by each of the main circuit block and the sub-circuit block. In this case, it is possible to generate key signals corresponding to quarter video frames processed in the main circuit block and sub-circuit block of each video image processing unit.

For example, the video image processing units may each include a signal generator. When the quartering-4K mode is a square division standard, the signal generator may generate, as a key signal having a wipe shape, a key signal having a shape of a quarter of a shape obtained by enlarging a wipe shape corresponding to an HD video frame horizontally and vertically twice, and when the quartering-4K mode is a 2-sample interleave division standard, the signal generator may generate, as a key signal having a wipe shape, a key signal having a shape identical to a wipe shape of an HD video frame.

For example, the signal switching apparatus may further include first and second cabinets each including the video image processing units, the video input unit, the video selection unit, and the video output unit. While the video image processing units operate in quartering-4K mode, first and second quarter video frames of first to fourth quarter video frames obtained by quartering a 4K video frame may be processed in the video image processing units included in the first cabinet, and the third and fourth quarter video frames may be processed in the video image processing units included in the second cabinet. This allows for effective use of the number of inputs of the cabinets.

As seen above, in the present technology, the vide, image processing units are controlled so that they operate in HD mode and quartering-4K mode. This allows for effective use of the hardware, that is, the video image processing units.

According to the present technology, the hardware can be used effectively. Note that the effects described above are only illustrative and any effects described in the present disclosure can be obtained.

BRIEF DESCRIPTION OF THE DRAWINGS

FIGS. 1A and 2B are diagrams showing the square division standard and the 2-sample interleave division standard, which are quartering-4K mode;

DETAILED DESCRIPTION OF EMBODIMENTS

Now, an embodiment of the present technology (hereafter simply referred to as the embodiment) will be described. The description will be made in the following order:

1. Embodiment
2. Modification

1. Embodiment

Signal Switching System

Figure 1:
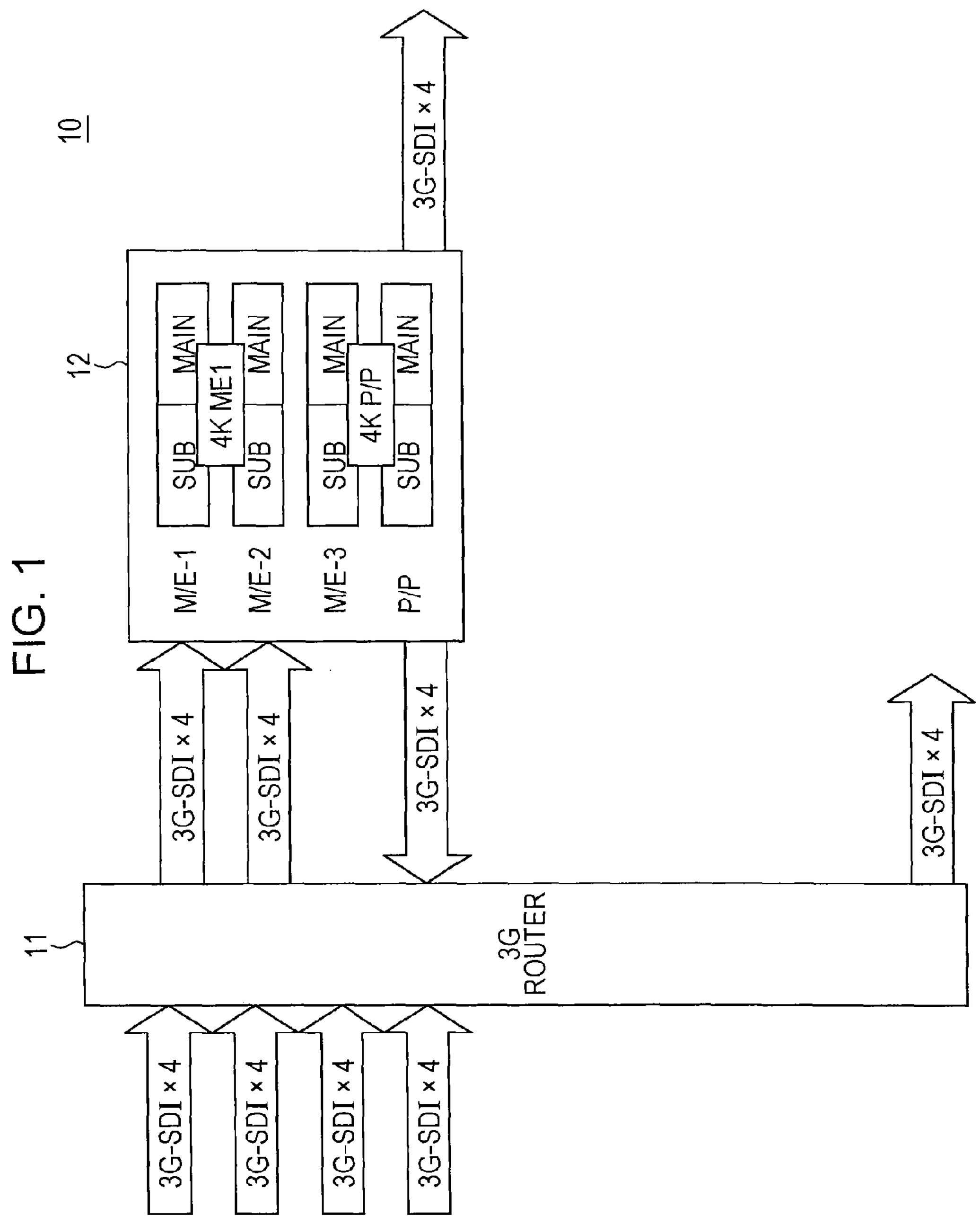
FIG. 1 is a block diagram showing an example configuration of a signal switching system.

FIG. 1 shows an example configuration of a signal switching system 10 according to an embodiment. The signal switching system 10 includes a 3G router 11 and a cabinet 12. The 3G router 11 selectively transmits video signals transmitted from a video camera in a studio or outside broadcast site, video signals played back in a video storage, or the like to the cabinet 12 or transmits video signals processed in the cabinet 12 to outside.

The 3G router 11 handles 3G-SDI signals as HD video signals. A HD video frame signal includes a single 3G-SDI signal. A 4K video frame signal, on the other hand, includes four 3G-SDI signals corresponding to four quarter video frames obtained by quartering a 4K video frame.

In an example shown in FIG. 1, "3G-SDI*4" represents a 4K video frame signal including four 3G-SDI signals. This example shows a state in which the cabinet 12 is handling 4K video frame signals in quartering-4K mode. When the cabinet 12 is placed in HD mode, the 3G router 11 and cabinet 12 handle HD video frame signals. Further, even when the cabinet 12 is placed in quartering-4K mode, it can handle 4K video frame signals, as well as HD video frame signals.

Hereafter, there will be described the square division standard and the 2-sample interleave division standard that realize quartering-4K mode in the present embodiment.

Figure 2A:
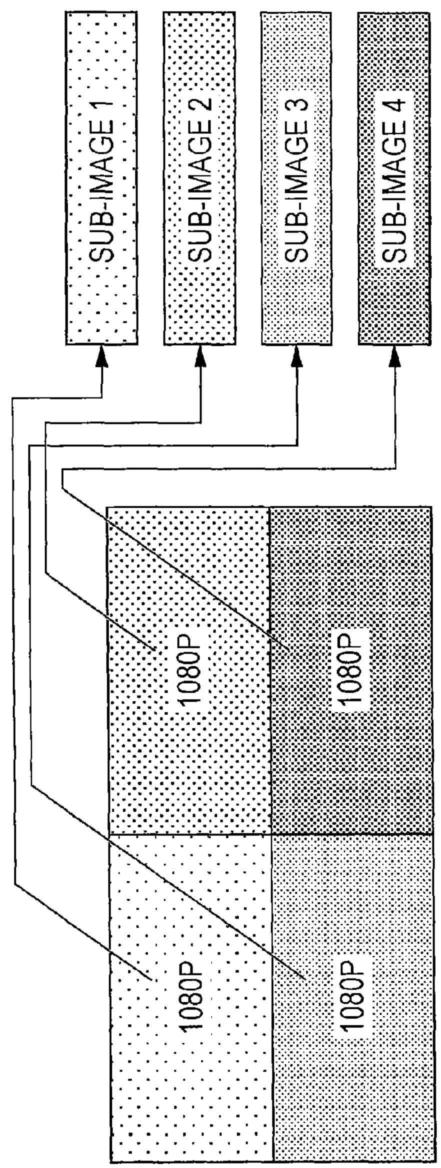
Figure 2B:
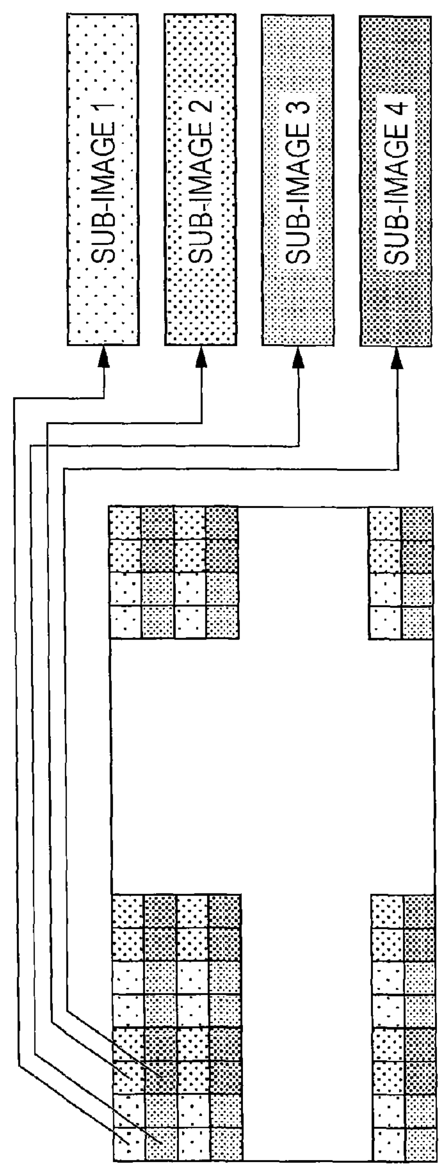

First, the square division standard will be described. As shown in FIG. 2A, in the square division standard, a 4K video frame is halved horizontally and vertically to give four quarter video frames, that is, sub-images 1 to 4.

Next, the 2-sample interleave division standard will be described. In the 2-sample interleave division standard, 2 pixels (2 samples) are alternately extracted from each even-numbered line to give 2 quarter video frames, that is, sub-images 1, 2. Similarly, 2 pixels (2 samples) are alternately extracted from each odd-numbered line to give 2 quarter video frames, that is, sub-images 3, 4.

Referring back to FIG. 1, the cabinet 12 includes multiple M/E banks (HD M/E banks) as video image processing units. Each M/E bank operates in HD mode or quartering-4K mode. Each M/E bank also includes a main circuit block (Main) and a sub-circuit block (Sub). In HD mode, the main circuit block and sub-circuit block process HD video frames; in quartering-4K mode, they process quarter video frames obtained by quartering 4K video frames.

There are two types of M/E banks: numbered (or suffixed) M/E banks and P/P (program/preset) M/E banks. FIG. 1 shows three numbered M/E banks and one P/P M/E bank. In quartering-4K mode, the main circuit blocks and sub-circuit blocks of two M/E banks process four quarter video frames in parallel.

In addition to the main circuit block and sub-circuit block, each M/E bank includes one or more keyer circuit blocks. In quartering-4K mode, at least one of the keyer circuit blocks is used exclusively by each of the main circuit block and sub-circuit block. This allows for generation of a key signal corresponding to each quarter video frame.

Figure 3:
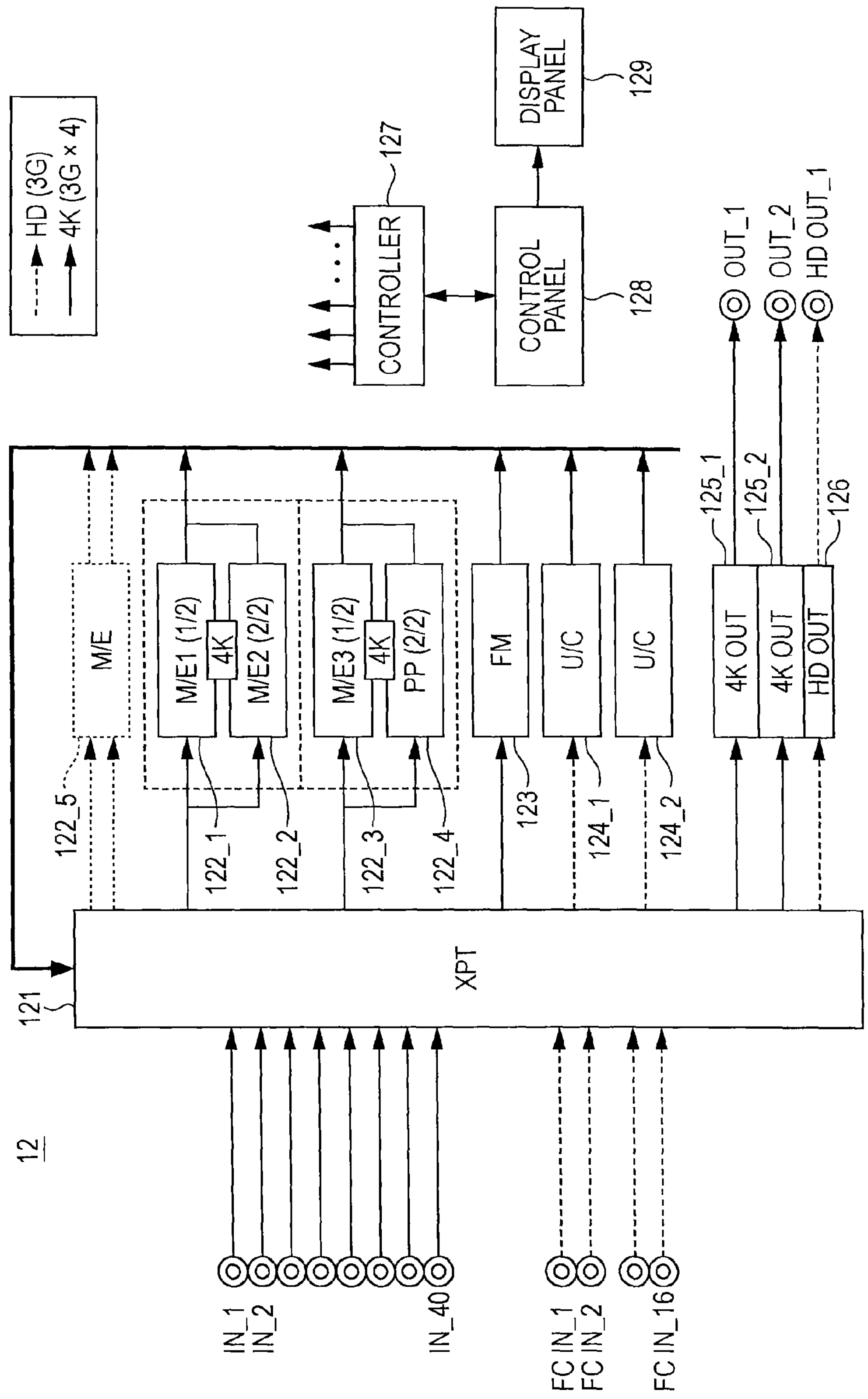
FIG. 3 is a diagram showing a specific example configuration of a cabinet used in the signal switching system.

FIG. 3 shows a specific example configuration of the cabinet 12. The cabinet 12 has 4K video frame signal input terminals IN_1 to IN_40, HD video frame signal input terminals FC IN_1 to FC IN_16, 4K video frame signal output terminals OUT_1 and OUT_2, and an HD video frame signal output terminal HD OUT_1.

The cabinet 12 also includes a cross-point (XPT) unit 121 serving as a video selection unit, live M/E banks 122_1 to 122_5, a frame memory (FM) 123, up-converters (U/C) 124_1 and 124_2, 4K video frame signal output units (4K OUT) 125_1 to 125-2, and an HD video frame signal output unit (HD OUT) 126.

The cabinet 12 also includes a control unit 127 configured to control the operation of the respective elements. The control unit 127 controls the operation of the elements on the basis of a user operation inputted from a control panel (console) 128 outside the cabinet 12. Connected to the control panel 128 is a display panel 129. The display panel 129 displays a graphical user interface (GUI) so that the user can easily set, for example, the operation mode of the cabinet 12, or the like. Details of the operation mode setting will be described later.

The M/E banks 122_1 to 122_4 process both HD video frame signals and 4K video frame signals. Specifically, the M/E banks 122_1 to 122_5 process HD video frame signals when the cabinet 12 is placed in HD mode; they process 4K video frame signals when the cabinet 12 is placed in quartering-4K mode.

In the latter case, the M/E banks 122_1 and 122_2 are combined and thus a total of four circuit blocks (main circuit blocks (Main) and sub-circuit blocks (Sub)) form one 4K M/E bank and process 4K video frame signals (video signals corresponding to four quarter video frames). Similarly, the M/E banks 122_3 and 122_4 are combined and thus a total of four circuit blocks (main circuit blocks (Main) and sub-circuit blocks (Sub)) form one 4K M/E bank and process 4K video frame signals (video signals corresponding to four quarter video frames).

The M/E bank 122_5 processes only HD video frame signals. For example, when the cabinet 12 is placed in quartering-4K mode, an HD video frame signal inputted to one of the video signal input terminals FC IN_1 to FC IN_16 is provided to the M/E bank 122_5 by controlling the cross-point unit 121 and thus processed or used to synthesize an image, and then outputted to the output terminal HD OUT_1 through the cross-point 121 and output unit 126.

The frame memory (FM) 123 temporarily stores, for example, a video signal inputted from one of the video signal input terminals or video frame data outputted from one of the M/E banks. This video frame data is read as necessary and then processed or used to synthesize an image in an M/E bank. While the frame memory 123 is shown in single-input, single-output form in FIG. 3, multiple frame memories 123 are disposed in practice. These frame memories can be used separately for HD video frames, or a set of four of them can be used for 4K video frames. That is, the frame memory 123 can be used for both HD video frames and 4K video frames by controlling the record or output of each frame memory and controlling the cross-point 121. In another embodiment, image data received via a network may be written to the frame memory 123 (by providing a network interface or the like).

The up-converters (U/C: up-converter) 124_1 and 124-2 convert HD video frame signals into 4K video frame signals. For example, when the cabinet 12 is placed in quartering-4K mode, an HD video frame signal inputted to one of the video signal input terminals FC IN_1 to FC IN_16 is provided to the up-converters 124_1 and 124-2 by controlling the cross-point unit. 124 and thus converted into a 4K video frame signal, and then provided to a 4K signal processing unit. The up-converters 124_1 and 124-2 also receive an HD video frame signal processed in the M/E bank 122_5 via the cross-point 121 and provide it to the 4K signal processing unit.

Since the cabinet 12 is configured as shown in FIG. 3, it can simultaneously use the respective M/E banks (groups of M/E banks) for different purposes in accordance with the purposes of video signals to be outputted. In other words, the cabinet 12 can cause the M/E banks to simultaneously process HD video signals and 4K video signals. In this way, the hardware can be used effectively.

Figure 4:
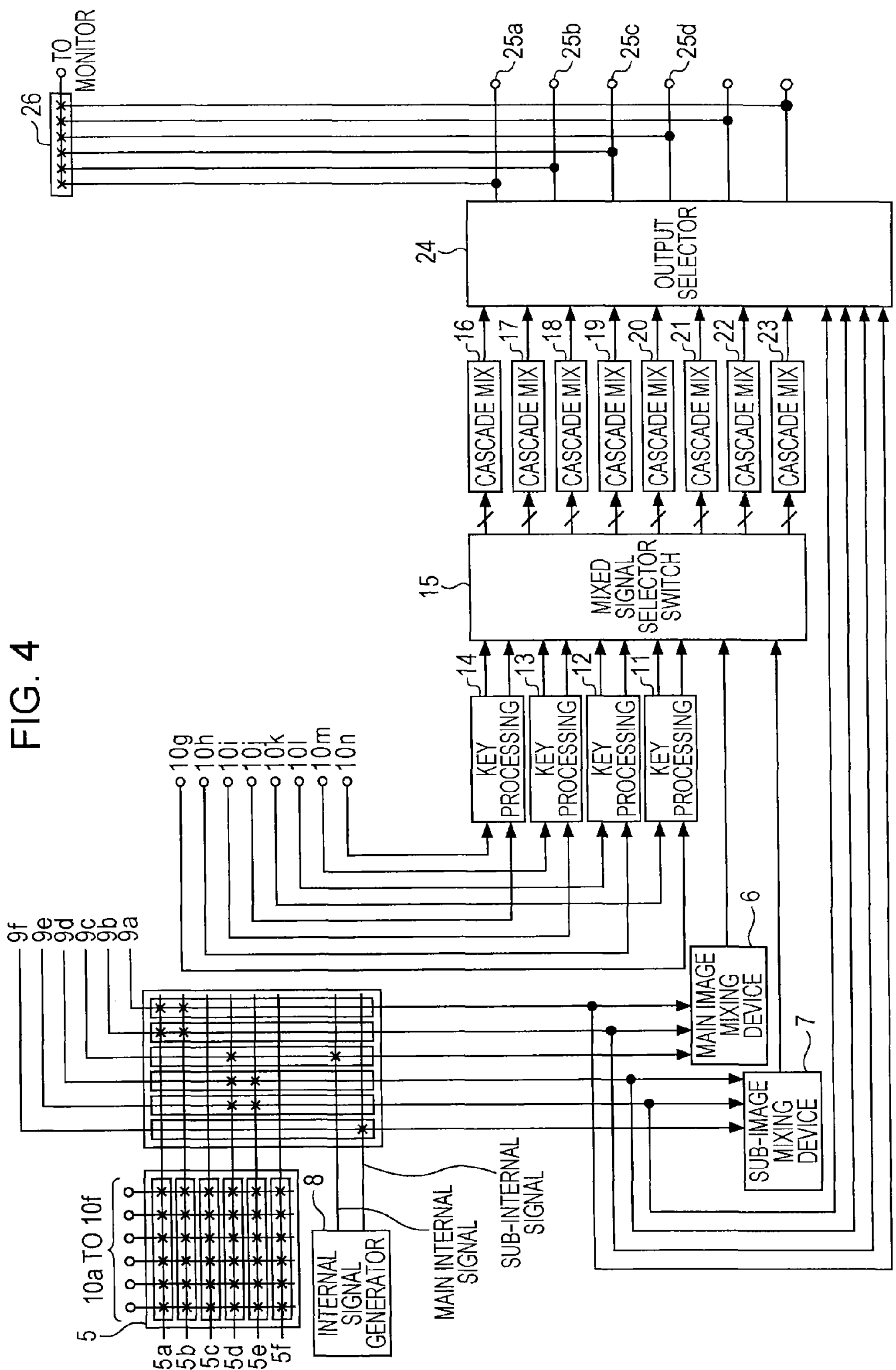
FIG. 4 is a block diagram showing an example configuration of an M/E bank.

FIG. 4 shows an example configuration of an M/E bank (see FIG. 3 of Japanese Unexamined Patent Application Publication No. 2007-166587). An input selection unit 5 corresponds to the cross-point 121 of the cabinet 12 shown in FIG. 3. In 4K mode, a half of key-related circuits (keyer circuit blocks: e.g., key processing blocks 11 to 14) each forming a system (there are four systems in FIG. 4) are assigned to each of the main and sub-circuit blocks. When the cabinet 12 is placed in non-4K and non-quartering mode, all key-related circuits are assigned to the main circuit blocks. When the cabinet 12 is placed in non-4K and quartering mode, the key-related circuits are assigned to the main circuit blocks and sub-circuit blocks on the basis of the setting.

A main image mixing device (circuit block) 6 mixes and makes a transition of a main-side background. Cascade mixes 16 to 23 superimpose, on the main-side background, keyer images outputted from the assigned key processing blocks of the key processing blocks 11 to 14. A sub-image mixing device (circuit block) 7 mixes and makes a transition of a sub-side background. The cascade mixes 16 to 23 superimpose, on the sub-side background, keyer images outputted from the assigned key processing blocks of the key processing blocks 11 to 14.

An internal signal generator 8 generates a wipe signal (a key signal used to mix a wipe). Where a wipe is performed by a fader, signal generation by the internal signal generator 8 is controlled based on a control value (fader value: 0% to 100%). The internal signal generator 8 includes two signal generators. One of these generates and outputs a main internal signal; the other generates and outputs a sub-internal signal. In 4K mode (or a mode in which an main/sub division is performed by only HD processing (detailed description is omitted)), an main internal signal is generated and controlled as a main wipe signal, and a sub-internal signal is generated and controlled as a sub-wipe signal.

Figure 5A:
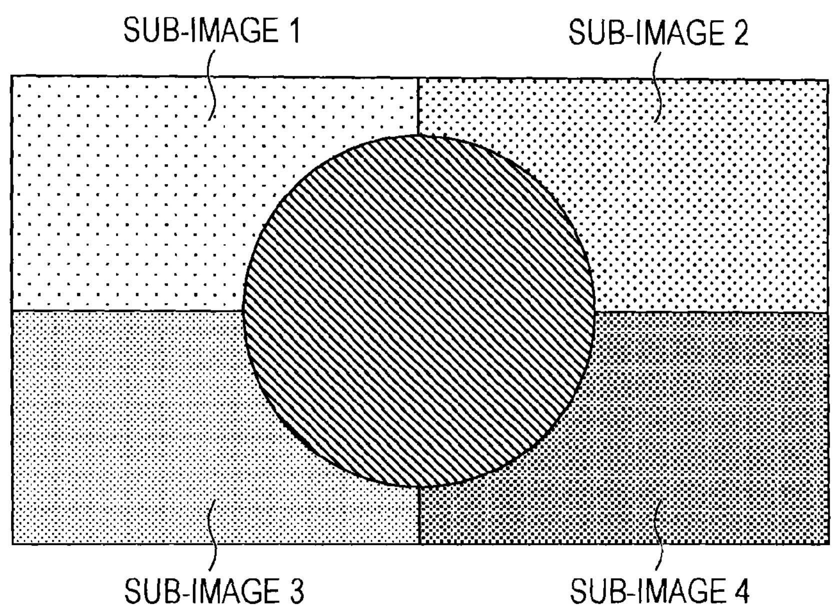
FIGS. 5A and 5B are diagram showing the relationship between the pixel positions of quarter video frames (sub-images 1 to 4) and the shape of a wipe signal according to the square division standard and 2-sample interleave division standard.
Figure 5B:
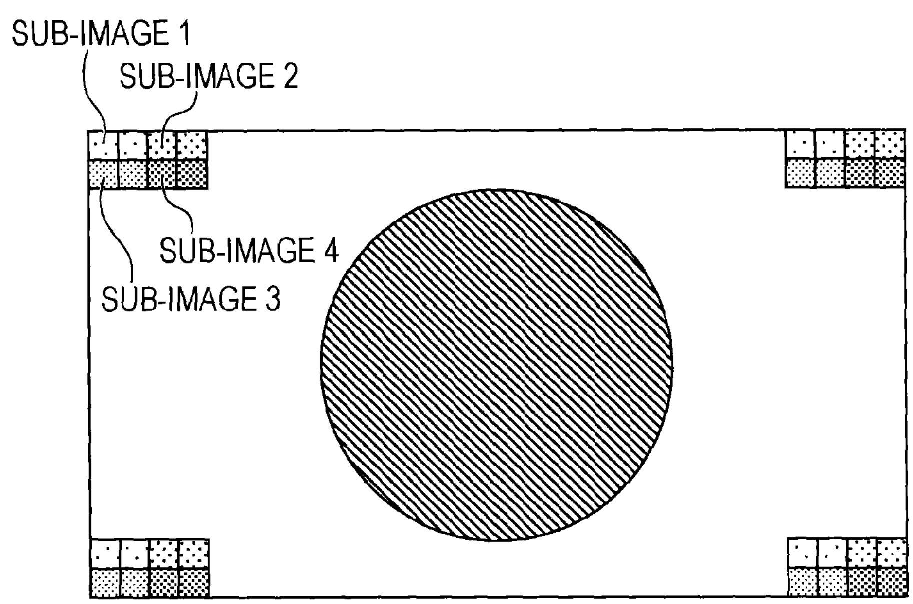

Next, a wipe signal generated in quartering-4K mode will be described. The shape of a wipe signal is controlled so that it varies between the square division standard and 2-sample interleave division standard. FIG. 5A shows the relationship between the pixel positions of the quarter video frames (sub-images 1 to 4) and the shape of a wipe signal according to the square division standard. FIG. 5B shows the relationship between the pixel positions of the quarter video frames (sub-images 1 to 4) and the shape of a wipe signal according to the 2-sample interleave division standard. In both diagrams, it is assumed that the wipe signal has a circular shape.

Figures 6A, 6B:
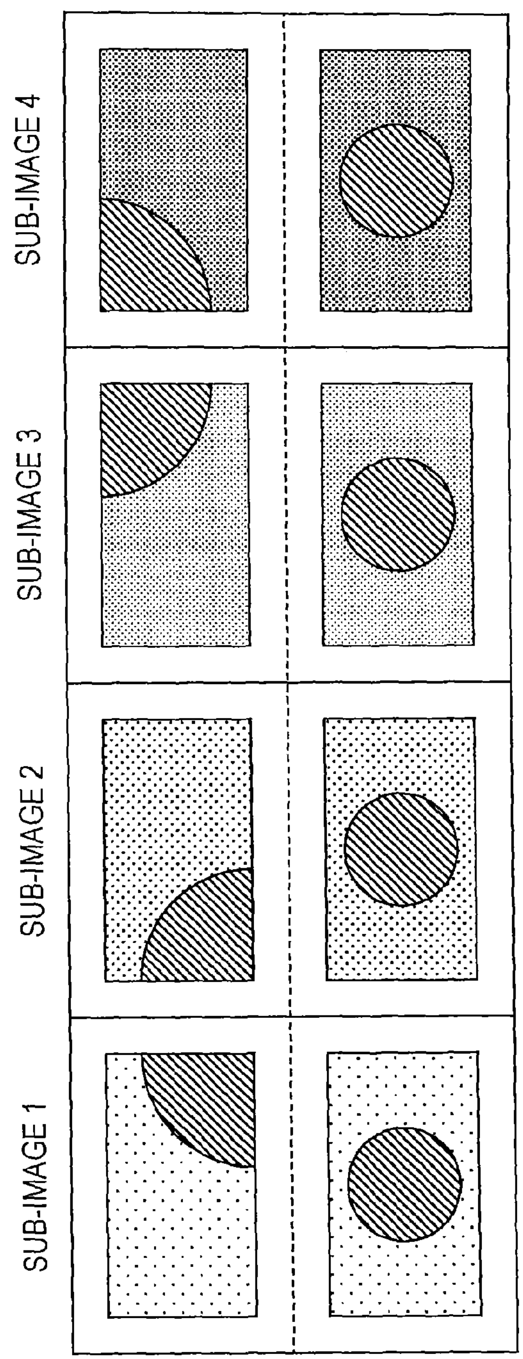
FIGS. 6A and 6B are diagrams showing the shapes of wipe signals generated in a manner corresponding to quarter video frames according to the square division standard (SQD) and the 2-sample interleave division standard (2SI)
Figure 7A:
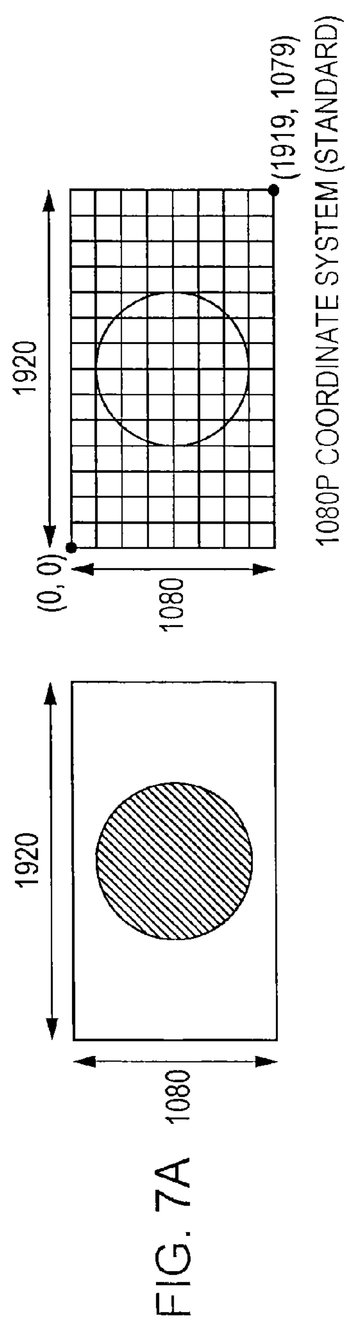
FIGS. 7A and 7B are diagrams showing wipe signals generated in a manner corresponding to quarter video frames according to the square division standard (SQD)
Figure 7B:
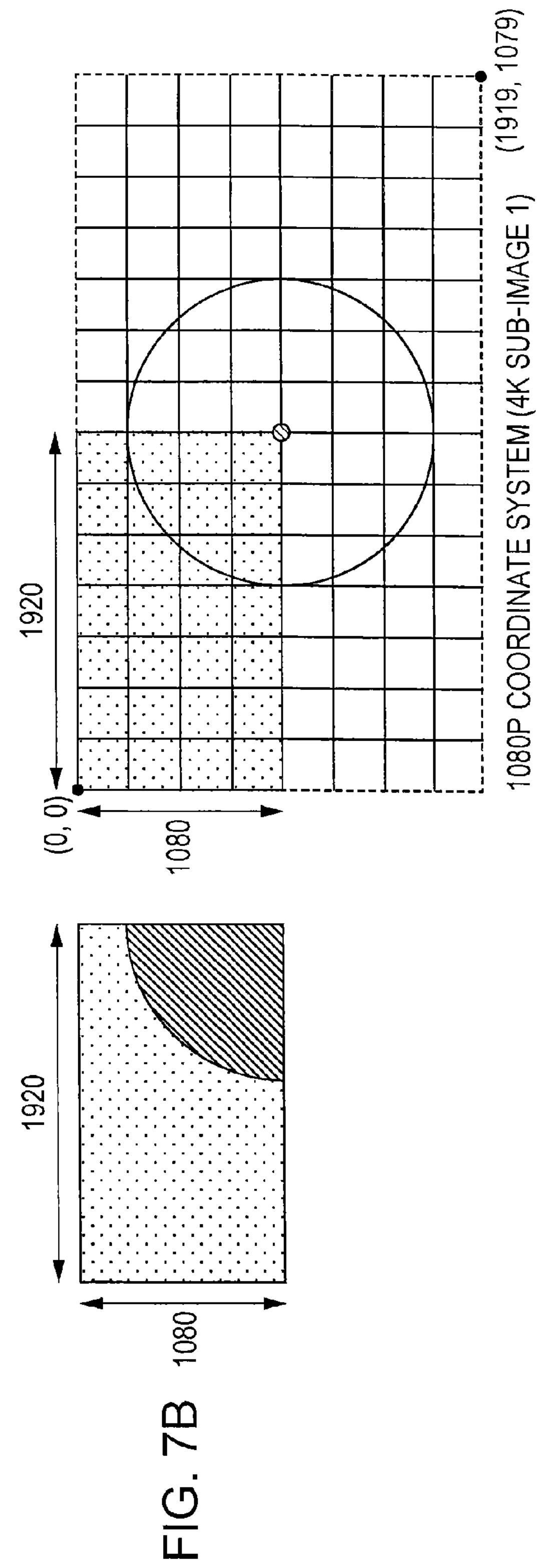

FIG. 6A shows the shapes of the wipe signal generated in a manner corresponding to the quarter video frames (sub-images 1 to 4) according to the square division standard (SQD). As shown in FIG. 7B, these shapes are the shapes of the respective quarters of a shape obtained by enlarging a wipe shape corresponding to an HD video frame shown in FIG. 7A horizontally and vertically twice. Specifically, the shape of the sub-image 1 is the shape of the upper-left quarter; the shape of the sub-image 2 is the upper-right quarter; the shape of the sub-image 3 is the lower-left quarter; and the shape of the sub-image 4 is the lower-right quarter.

In practice, the inclinations of H Ramp and V Ramp, for example, are half those of an HD video signal. Thus, the distance between the H and V coordinates is doubled. Further, the wipe shape for the sub-image 1, for example, is calculated assuming that the center of the pattern is located at a lower-right position. Similarly, the wipe shapes for the sub-images 2, 3, and 4 are calculated assuming that the center of the pattern is located at a lower-left position, an upper-right position, and an upper-left position, respectively.

Figure 8:
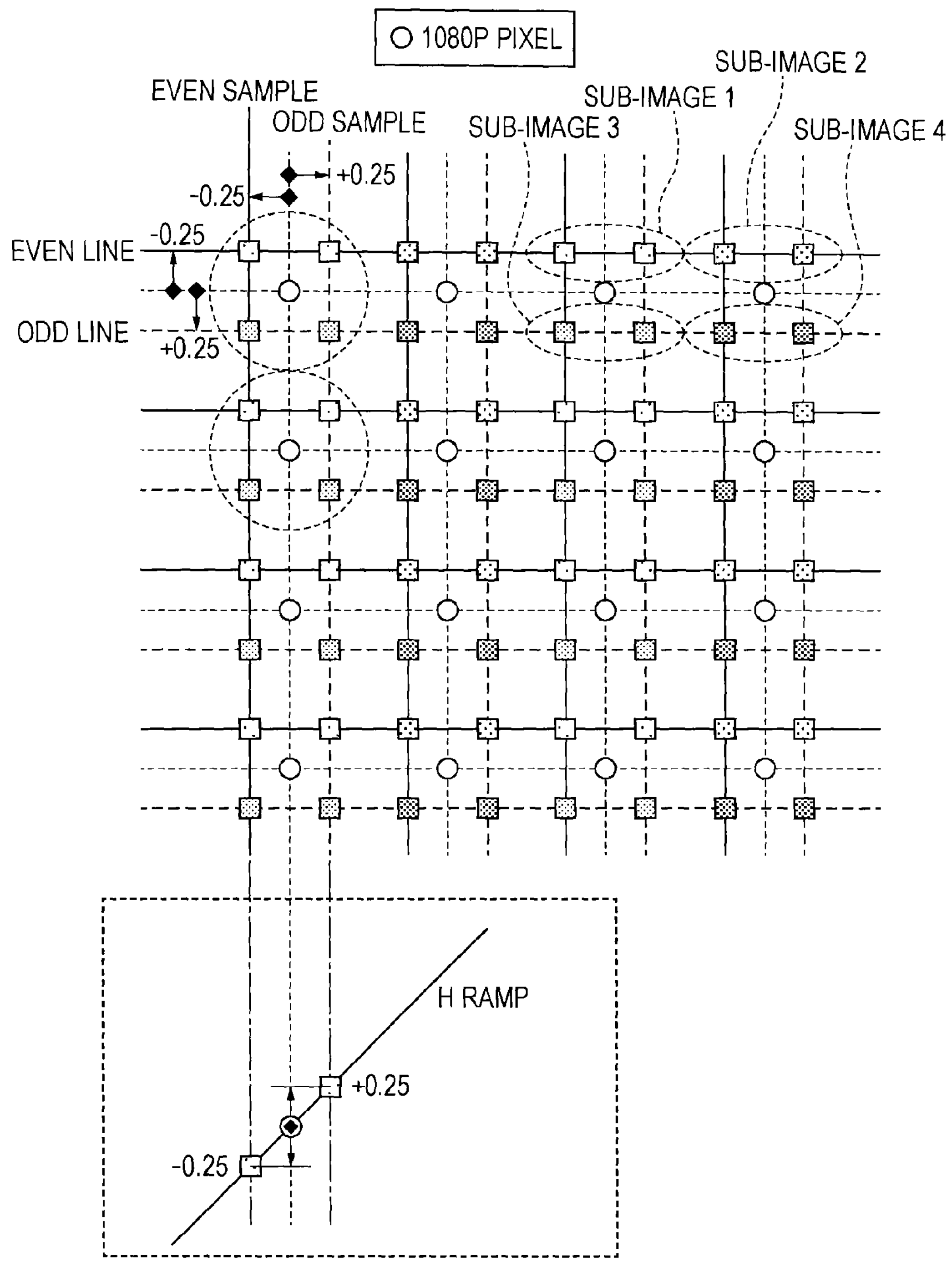
FIG. 8 is a diagram showing a wipe signal generated in a manner corresponding to quarter video frames according to the 2-sample interleave division standard (2SI)

FIG. 6B shows the shapes of a wipe signal generated in a manner corresponding to the quarter video frames (sub-images 1 to 4) according to the 2-sample interleave division standard (2SI). These shapes are approximately the same as the shape of an HD video wipe signal. FIG. 8 shows 4K coordinates according to the 2-sample interleave division standard. Four points of ±0.25 pixel and ±0.25 line relative to the coordinates 1080P (shown by "O") are defined as 4K coordinates.

While the points displaced by ±0.25 pixel are arranged at intervals of 0.5 pixel on a 4K screen, the waveform of H Ramp is actually generated concurrently with that of 1080P. This H Ramp waveform serves as the source of the H-direction coordinates. The H Ramp waveform for an even sample is generated so that it has a smaller value than that for 1080P by 0.25 pixel; the H Ramp waveform for an odd sample is generated so that it has a larger value than that for 1080P by 0.25 pixel. The same applies to V Ramp. By calculating the wipe shapes of the quarter video frames (sub-images 1 to 4) using these H Ramp and V Ramp waveforms for even and odd samples, no-bumpy, smooth wipe shapes appear in 4 k images.

Figure 9:
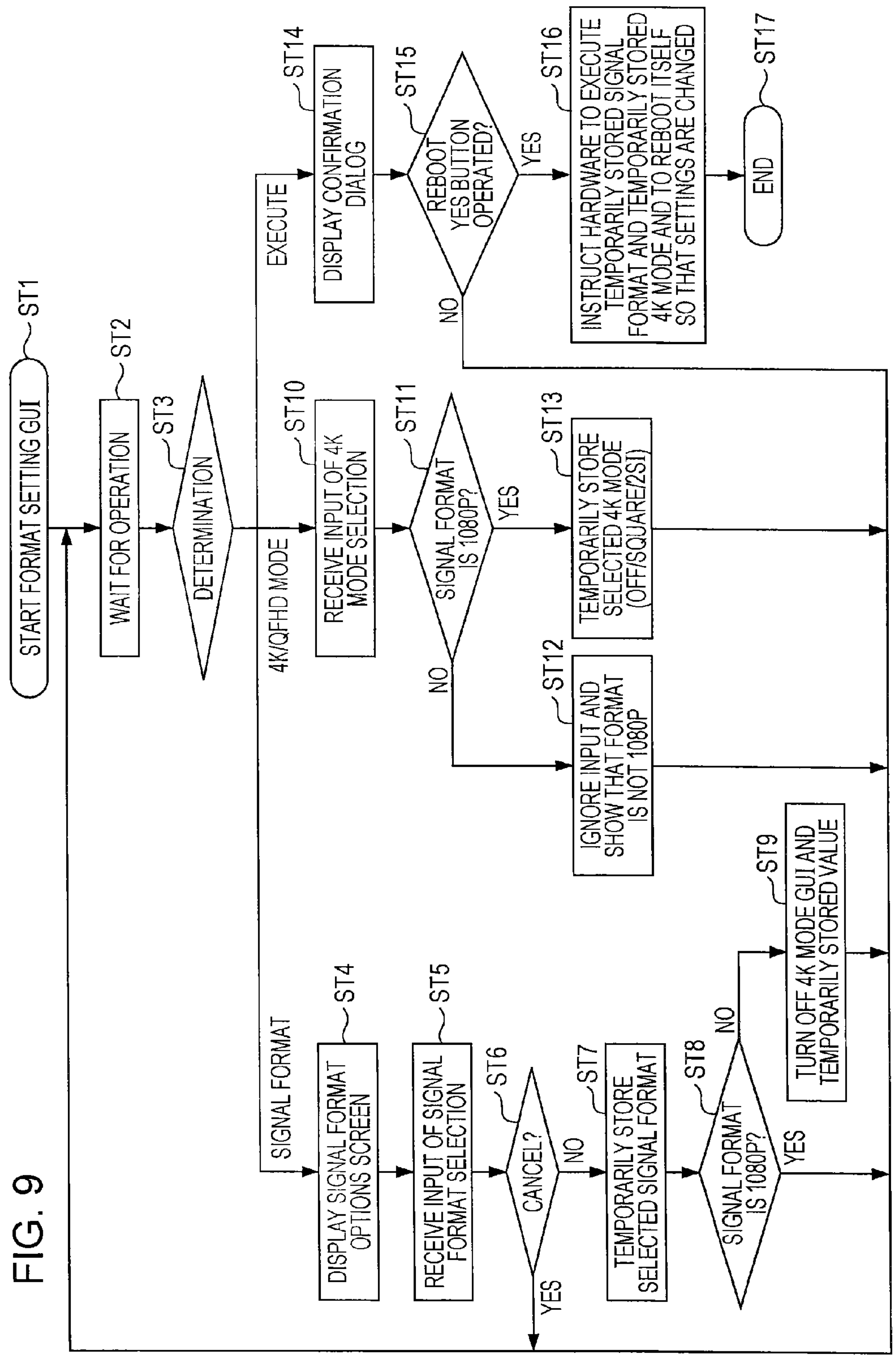
FIG. 9 is a flowchart showing an example of a cabinet operation mode setting process performed by a controller.
Figure 10:
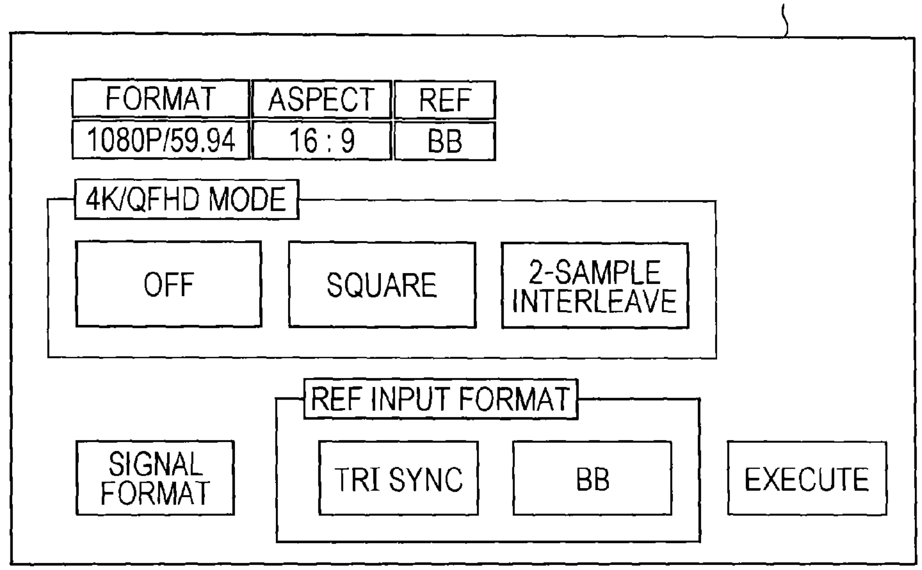
FIG. 10 shows an example of a GUI displayed during setting of a cabinet operation mode.

Referring now to the flowchart of FIG. 9, there will be described an example of a cabinet 12 operation mode setting process performed by the controller (control panel 128, control unit 127). In step ST1, the controller starts a format setting GUI or, the basis of an operation performed on the control panel 128 by the user. FIG. 10 shows an example of a GUI started on the display panel 129.

In step ST2, the controller displays Signal Format, Aspect, and Ref on the basis of the initial value or past operations and also displays a "4K/QFHD Mode" group in such a manner that one of three buttons thereof is colored differently on the basis of the initial value or past operations and thus indicates that the button is selected. It then waits for the user to operate the control panel 128. The user can perform setting of a signal format handled by the cabinet 12, setting of quartering-4K mode, and the like on the GUI of FIG. 10. If the user performs any operation in step ST2, the controller determines in step ST3 which of the buttons on the GUI has been operated.

Figure 11:
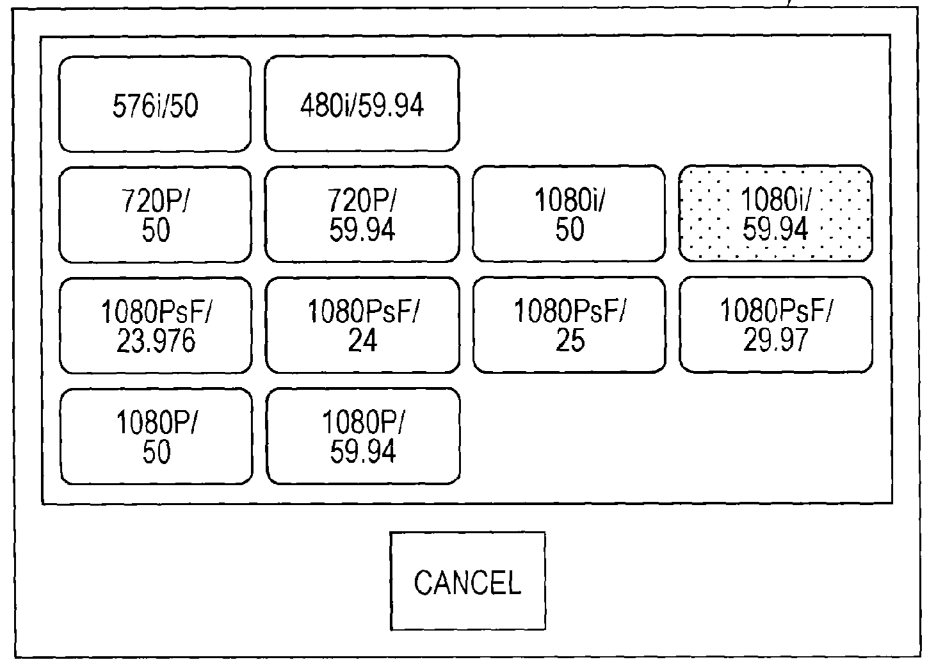
FIG. 11 shows an example of a GUI displayed during setting of a cabinet operation mode.

If the "Signal Format" button has been operated, the controller, in step ST4, displays a signal format options screen on the display panel 129. FIG. 11 shows an example of the signal format options screen. In step ST5, the controller receives input of a selection of a signal format.

In step ST6, the controller determines whether a cancel button has been operated. If the cancel button has been operated, it ends the signal format options screen and returns to step ST2. In contrast, if any signal format button other than the cancel button has been operated, the controller proceeds to step ST7. FIG. 11 shows a state immediately after a signal format button 1080i/59.94 has been operated. In step ST7, the controller temporarily stores the selected signal format.

In step ST8, the controller determines whether the selected signal format is 1080P (1080P/50 or 1080P/59.94). If the format is 1080P, the controller ends the signal format options screen and returns to step ST2. In contrast, if the format is not 1080P, the controller, in step ST9, turns off the 4K mode options GUI and the temporarily stored value, ends the signal format options screen, and returns to step ST2.

If the controller determines in step ST3 that any button of the "4K/QFHD Mode" group has been operated, it receives input of the mode selection in step ST10. That is, the user has already operated one of the Off button, the Square (square division standard (SQD)) button, and the 2-sample Interleave (2-sample interleave division standard (2SI)) button on the GUI of the control panel 128.

Figure 13:
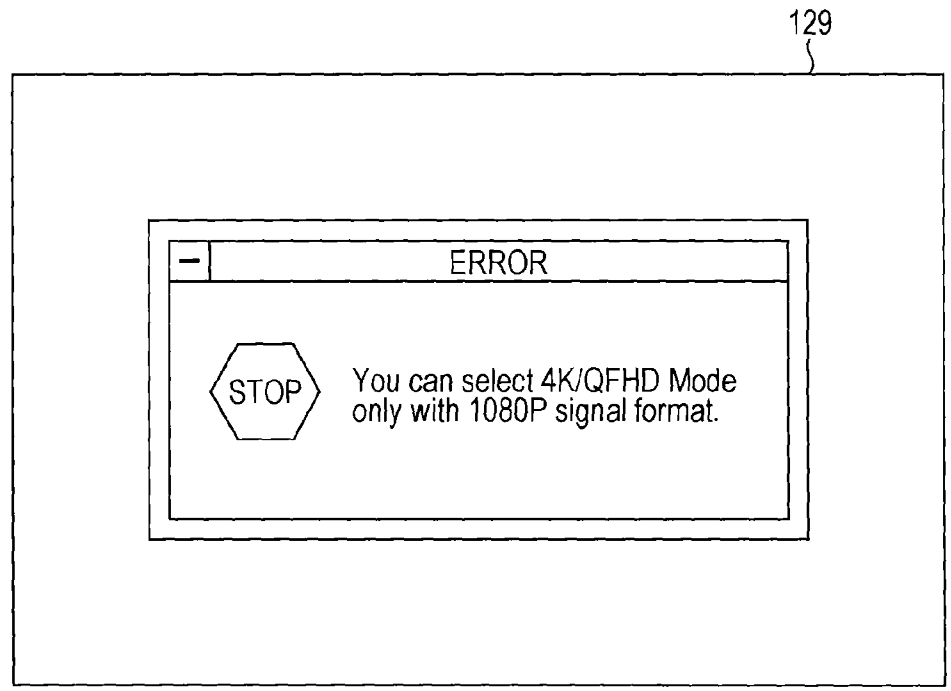
FIG. 13 shows an example of a GUI displayed during setting of a cabinet operation mode.

In step ST11, the controller determines whether the selected signal format is 1080P. If the signal format is not 1080P, the controller, in step ST12, ignores the input and shows on the display panel 129 that the selected signal format is not 1080P. FIG. 13 shows an example of a message to that effect. The controller then returns to step ST2. In contrast, if the signal format is 1080P, the controller, in step ST13, temporarily stores the selected 4K mode (Off/Square/2SI) and then returns to step ST2.

Figure 14:
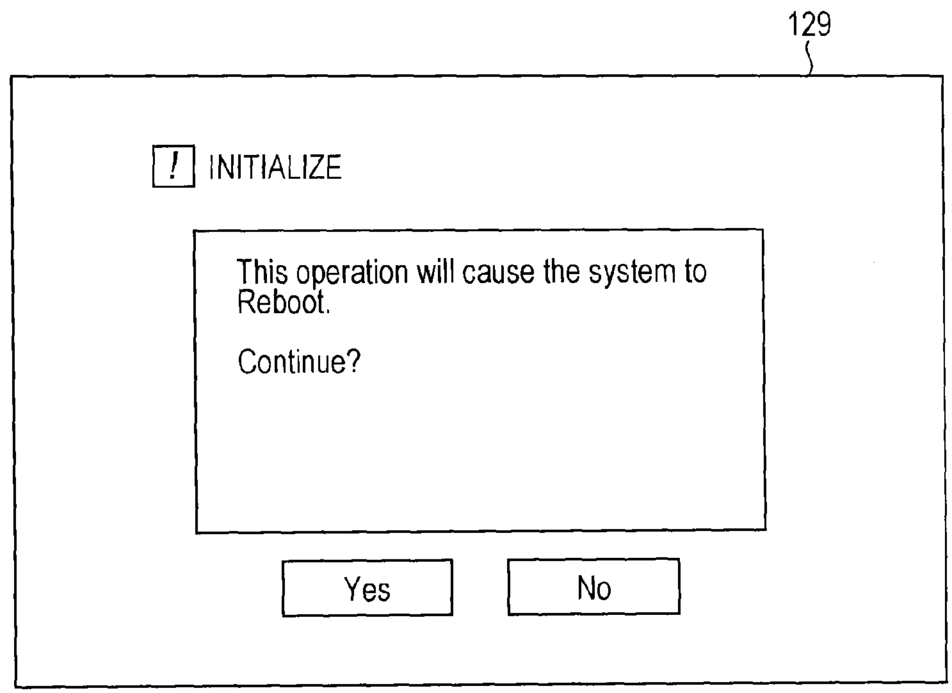
FIG. 14 shows an example of a GUI displayed during setting of a cabinet operation mode.

If the controller determines in step ST3 that an "Execute" button has been operated, it displays a confirmation dialog in step ST14. FIG. 14 shows an example of such a dialog. In step ST15, the controller determines whether a reboot "Yes" button has been operated. If a reboot "No" button has been operated, the controller returns to step ST2.

In contrast, if the reboot "Yes" button has been operated, the controller proceeds to step ST16. In step ST16, the controller instructs the hardware to execute the temporarily stored signal format and the temporarily stored 4K mode and to reboot itself so that the settings are changed. The controller then ends the operation mode setting process in step ST17.

Figure 15:
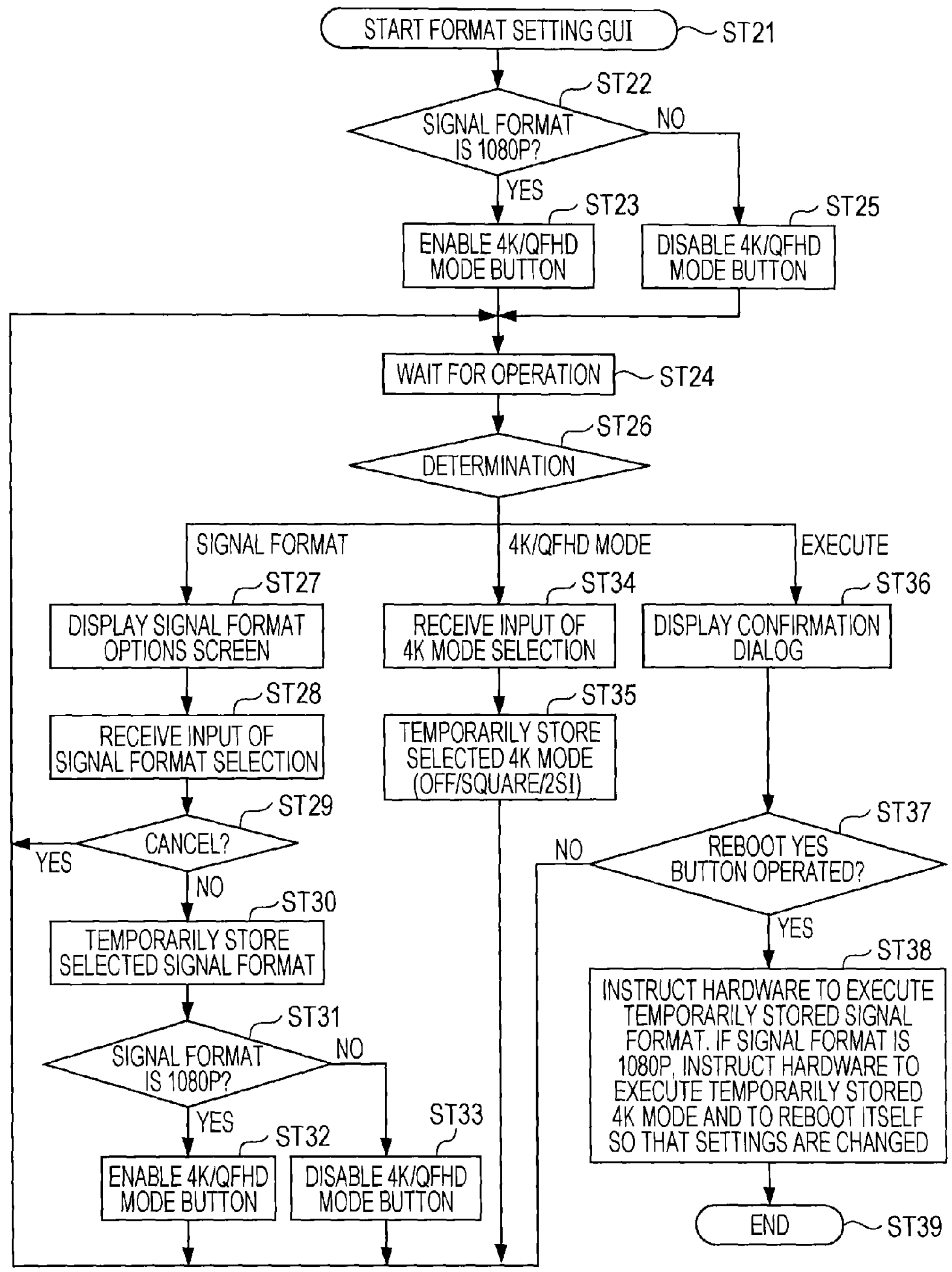
FIG. 15 is a flowchart showing another example of a cabinet operation mode setting process performed by a controller.

Next, referring to the flowchart of FIG. 15, there will be described another example of a cabinet 12 operation mode setting process performed by the controller (control panel 128, control unit 127). In the process shown in the flowchart of FIG. 9, the "4K/QFHD Mode" button is enabled even when the current signal format is a format other than 1080P and then whether the signal format is 1080P is checked (step ST11). In the process shown in the flowchart of FIG. 15, on the other hand, the "4K/QFHD Mode" button is enabled only when the current signal format is 1080P (step ST23).

In step ST21, the controller starts a format setting GUI on the basis of an operation performed on the control panel 128 by the user. The controller then proceeds to step ST22.

Figure 12:
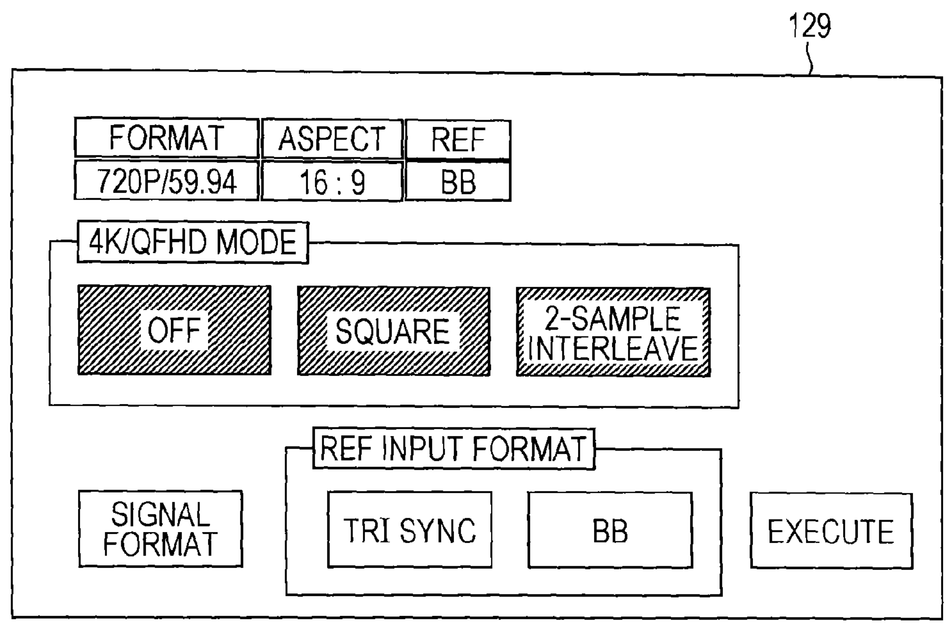
FIG. 12 shows an example of a GUI displayed during setting of a cabinet operation mode.

In step ST22, the controller determines whether the current signal format is 1080P. If the current format is 1080P, the controller, in step ST23, enables the "4K/QFHD Mode" buttons (see FIG. 10) and proceeds to step ST24. In contrast, if the current format is not 1080P, the controller, in step ST25, disables the "4K/QFHD Mode" buttons (see FIG. 12) and proceeds to step ST24. FIG. 12 shows a display state in which the quartering-4K mode GUI operation unit is disabled. In this display state, it is difficult for the user to select quartering-4K mode.

In step ST24, the controller waits for the user to operate the control panel 128. The user can perform setting of a signal format handled by the cabinet 12, setting of quartering-4K mode, and the like on the basis of the display of the GUI shown in FIG. 10 or 12. If the user performs an operation in step ST24, the controller, in step ST26, determines which of the buttons on the GUI has been operated.

If the "Signal Format" button has been operated, the controller, in step ST27, displays the signal format options screen on the display panel 129 (see FIG. 11). In step ST28, the controller receives input of a selection of a signal format.

In step ST29, the controller determines whether the Cancel button has been operated. If the cancel button has been operated, it returns to step ST24. In contrast, if a predetermined signal format button, instead of the Cancel button, has been operated, the controller proceeds to step ST30. In step ST30, the controller temporarily stores the selected signal format.

In step ST31, the controller determines whether the selected signal format is 1080P. If the format is 1080P, the controller, in step ST32, enables the "4K/QFHD Mode" button (see FIG. 10) and then proceeds to step ST24. In contrast, if the format is not 1080P, the controller, in step ST33, disables the "4K/QFHD Mode" button (see FIG. 12) and then proceeds to step ST24.

If the controller determines in step ST26 that any button of the "4K/QFHD Mode" group has been operated, it receives input of the mode selection in step ST34. That is, the user has already operated one of the Off button, the Square button, and the 2-sample Interleave button on the GUI of the control panel 128. The controller then temporarily stores the selected 4K mode (Off/Square/2SI) in step ST35 and then returns to step ST24.

If the controller determines in step ST25 that the "Execute" button has been operated, it displays the Confirmation dialog in step ST36 (see FIG. 14). In step ST37, the controller determines whether the reboot "Yes" button has been operated. If the reboot "No" button has been operated, the controller returns to step ST24.

In contrast, if the reboot "Yes" button has been operated, the controller proceeds to step ST38. In step ST38, the controller instructs the hardware to execute the temporarily stored signal format. If the signal format is 1080P, it also instructs the hardware to execute the temporarily stored 4K mode and to reboot itself so that the settings are changed. The controller then ends the operation mode setting process in step ST39.

As described above, the signal switching system 10 shown in FIG. 1 allows the multiple M/E banks included in the cabinet 12 to operate in HK mode or quartering-4K mode (square division standard, 2-sample interleave division standard). Thus, for example, the hardware, that is, the M/E banks can be used effectively.

Further, for the signal switching system 10 shown in FIG. 1, the user can set the mode of the cabinet 12, the signal format, and the like on the GUI. Thus, for example, usability for the user is improved.

2. Modification

Figure 16:
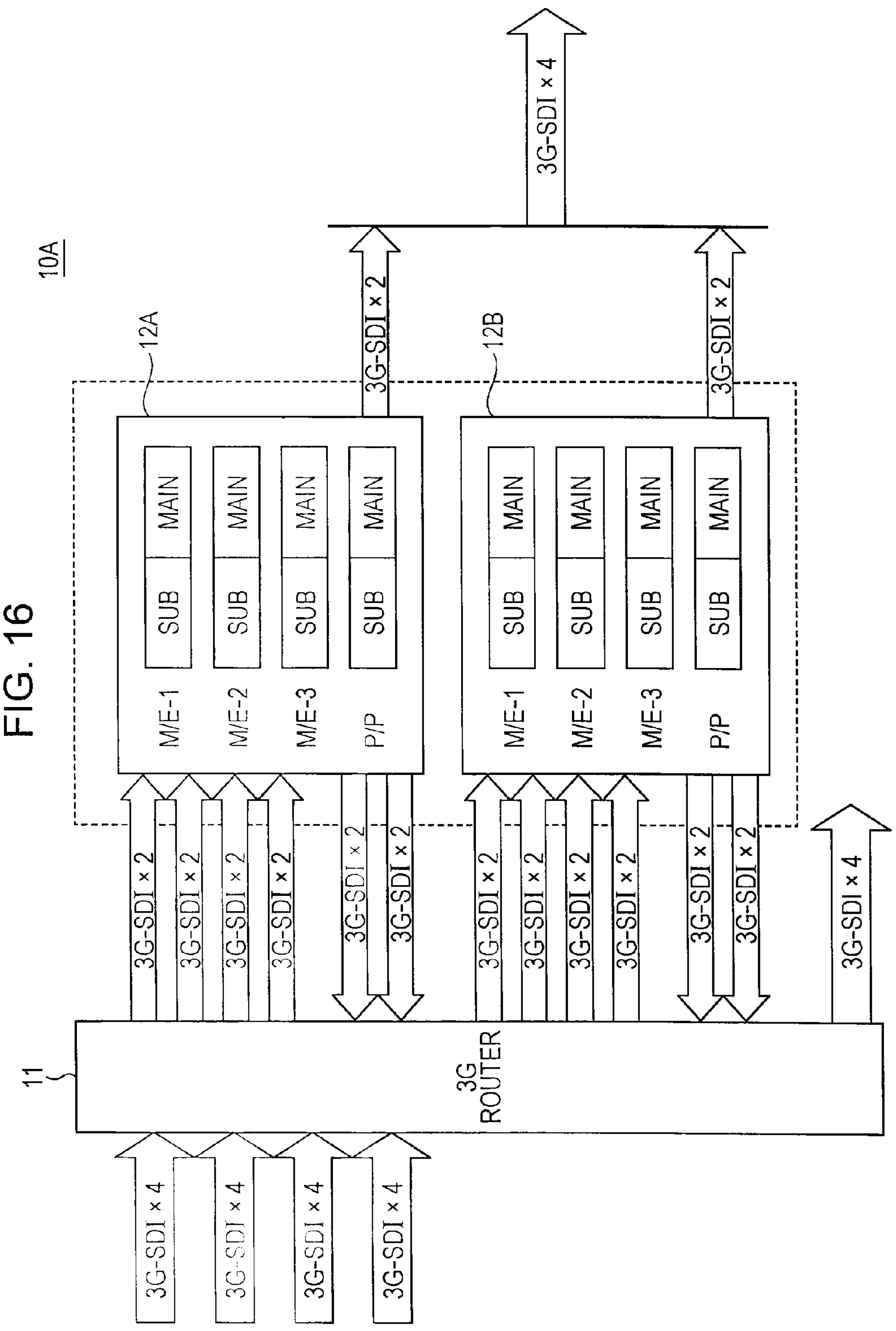
FIG. 16 is a block diagram showing another example configuration of a signal switching system.

In the above embodiment, there has been described the signal switching system 10 including one cabinet 12. On the other hand, FIG. 16 shows an example configuration of a signal switching system 10A including two cabinets, 12A and 122. The configuration of the cabinets 12A and 12B is similar to that of the cabinet 12 of the signal switching system 10 shown in FIG. 1 (see FIG. 3) and therefore will not be described in detail.

Where the cabinets 12A and 12B process video signals in quartering-4K mode, M/E banks included in the cabinet 12A (first cabinet) process first and second quarter video frames, and M/E banks included in the cabinet 12B (second cabinet) process third and fourth quarter video frames. Such a configuration allows for effective use of the number of inputs of the cabinets 12A and 12B.

Details will be described below. The SDI input terminals of the cabinets aim to receive 3G SDI signals. Where these SDI input terminals receive 4K video signals, a set of four SDI input terminals receives a set (sequence) of 4K video signals. Specifically, a single 4K video frame (image) is divided into a "sub-image 1", a "sub-image 2", a "sub-image 3", and a "sub-image 4", which are then transmitted through a first SDI cable, a second SDI cable, a third SDI cable, and a fourth SDI cable, respectively, of a set of SDI cables.

These sub-images are processed by main circuit blocks or sub-circuit blocks of M/E banks included in each cabinet. The main and sub circuit blocks are unit mix circuits for HD image processing. Assuming that each cabinet includes four M/E banks, the two cabinets include a total of 16 unit mix circuits (main and sub circuit blocks). By assigning 4K vide signal processing to all these unit mix circuits, four systems (four 4K M/Es) can be formed.

Figure 17:
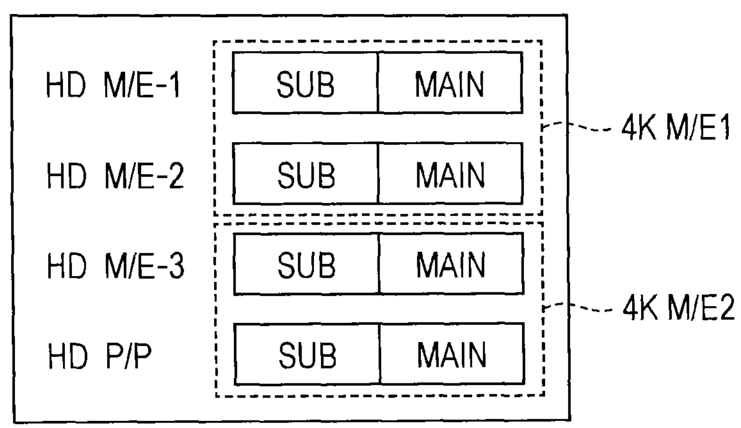
FIG. 17 is a diagram showing an example configuration of 4K M/Es included in two cabinets.
Figure 17:
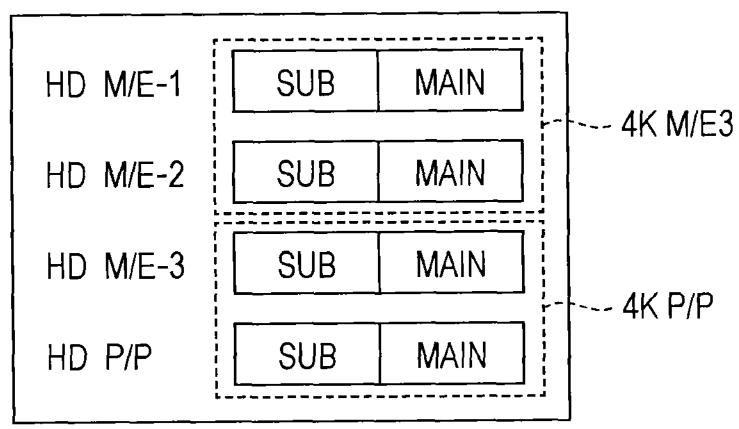

With respect to how the circuits of the two cabinets, first and second cabinets, are combined to form 4K M/Es, multiple combinations are conceivable. FIG. 17 shows an example in which two 4K M/Es are formed for each cabinet. A 4K M/E1 processes signals as follows. That is, the sub-circuit block of the HD M/E-1 of the first cabinet processes "sub-image 1"; the main circuit block of the HD M/E-1 of the first cabinet processes "sub-image 2"; the sub-circuit block of an HD M/E-2 of the first cabinet processes "sub-image 3"; and the main circuit block of the HD M/E-2 of the first cabinet processes "sub-image 4". A 4K M/E2, a 4K M/E3, and a 4K P/P are also configured as shown in FIG. 17.

In a signal switching system (switcher) which selects and uses any input, any 4K M/E bank thereof preferably can select all 4K video inputs. To this end, four SDI cables forming respective 4K video inputs have to be provided to circuits which process relevant "sub-images," under cross-point control. That is, four SDI cables forming respective 4K video inputs have to be connected to both the first and second cabinets. In this case, it is possible to use up to the number of 4K video inputs corresponding to one-fourth the number of SDI input terminals of each cabinet. Further, where signals processed in the 4K M/E1 and 4K M/E2 of the first cabinet are reprocessed in the 4K M/E3 and 4K P/P of the second cabinet or where signals are processed in the reverse direction, the output/input terminals of the first and second cabinets have to be connected together. The number of actually available SI input terminals is reduced accordingly.

Figure 18:
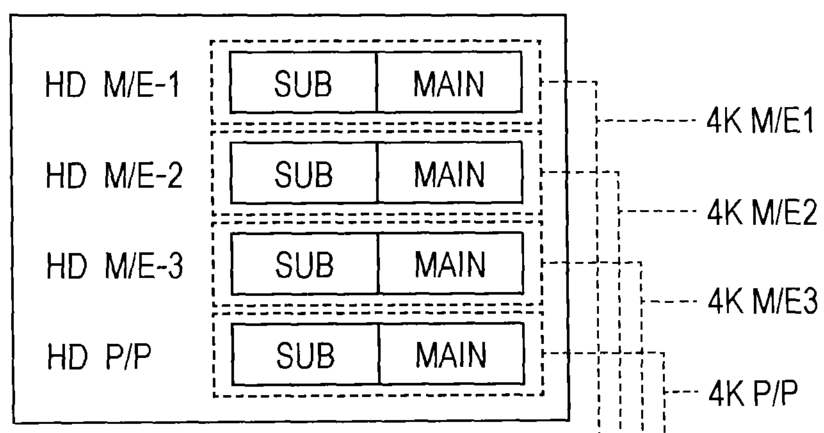
FIG. 18 is a diagram showing another example configuration of 4K M/Es included in two cabinets.
Figure 18:
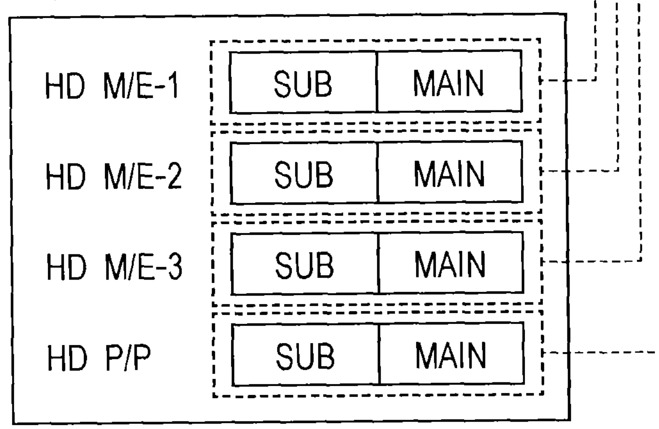

For this reason, the signal switching system 10A of FIG. 16 is configured as shown in FIG. 18. In this configuration, the 4K M/E1 processes signals as follows. That is, the sub-circuit block of the HD M/E-1 of the first cabinet processes "sub-image 1"; the main circuit block of the HD M/E-1 of the first cabinet processes "sub-image 2"; the sub-circuit block of the HD M/E-1 of the second cabinet processes "sub-image 3"; and the main circuit block of the HD M/E-1 of the second cabinet processes "sub-image 4". The other 4K M/Es also process signals in the same way. That is, the first cabinet processes "sub-image 1" and "sub-image 2", and the second cabinet processes "sub-image 3" and "sub-image 4."

In this configuration, of four SDI cables forming respective 4K video inputs, the first and second SDI cables are connected to the first cabinet, and the third and fourth SDI cables are connected to the second cabinet. This makes available up to the number of 4K video inputs corresponding to half the number of SDI input terminals of each cabinet. Further, where the 4K M/E1, 4K M/E2, 4K M/E3, and 4K P/P reprocess each other output signals, the cabinets 1 and 2 do not have to be connected together. That is, by using this configuration, it is possible to efficiently assign the limited number of SDI input terminals (SDI input circuits) and to make more 4K video signal inputs available as options for switching.

The present technology may be configured as follows:

(1) A signal switching apparatus including: multiple video image processing units; a controller configured to control operation of the video image processing units; and a graphical user interface (GUI) configured to receive input of a selection between an HD mode and a quartering-4K mode which are operation modes of the video image processing units, wherein the controller controls the video image processing units so that the video image processing units operate in the HD mode or quartering-4K mode, on the basis of a selection inputted to the GUI.

(2) The signal switching apparatus according to the above (1), wherein the GUI receives input of a selection between a square division standard and a 2-sample interleave division standard which are both the quartering-4K m de.

(3) The signal switching apparatus according to the above (1) or (2), wherein while 1080P is selected as a signal format, the GUI is allowed to receive input of a selection of the quartering-4K mode.

(4) A signal switching apparatus including: multiple video image processing units each including a main circuit block, a sub-circuit block, and one or more keyer circuit blocks; a video input unit; a video selection unit configured to select 9 predetermined video signal from among multiple video signals inputted to the video input unit and to input the predetermined video signal to the video image processing units; a video output unit configured to output video signals processed in the video image processing units; and a controller configured to control operation of the video image processing units, wherein the controller controls the video image processing units so that the video image processing units operate in an HD mode or quartering-4K mode.

(5) The signal switching apparatus according to the above (4), further including a graphic user interface (GUI) configured to receive input of a selection between the HD mode and the quartering-4K mode as an operation mode of the video image processing units, wherein the controller controls the video image processing units so that the video image processing units operate in the HD mode or quartering-4K mode, on the basis of a selection inputted to the GUI.

(6) The signal switching apparatus according to the above (5), wherein the GUI receives input of a selection between a square division standard and a 2-sample interleave division standard which are both the quartering-4K mode.

(7) The signal switching apparatus according to any one of the above (4) to (6), wherein while the video image processing units operate in the HD mode, the main circuit block and sub-circuit block of each video image processing unit process HD video frames, and wherein while the video image processing units operate in the quartering-4K mode, the main circuit block and sub-circuit block of each video image processing unit process quarter video frames obtained by quartering a 4K video frame.

(8) The signal switching apparatus according to any one of the above (4) to (7), wherein while the video image processing units operate in the quartering-4K mode, at least one of the keyer circuit blocks is used exclusively by each of the main circuit block and the sub-circuit block.

(9) The signal switching apparatus according to the above (8), wherein the video image processing units each include a signal generator, wherein when the quartering-4K mode is a square division standard, the signal generator generates, as a key signal having a wipe shape, a key signal having a shape of a quarter of a shape obtained by enlarging a wipe shape corresponding to an HD video frame horizontally and vertically twice, and when the quartering-4K mode is a 2-sample interleave division standard, the signal generator generates, as a key signal having a wipe shape, a key signal having a shape identical to a wipe shape of an HD video frame.

(10) The signal switching apparatus according to any one of the above (4) to (9), further including first and second cabinets each including the video image processing units, the video input unit, the video selection unit, al, the video output unit, wherein while the video image processing units operate in quartering-4K mode, first and second quarter video frames of first to fourth quarter video frames obtained by quartering a 4K video frame are processed in the video image processing units included in the first cabinet, and the third and fourth quarter video frames are processed in the video image processing units included in the second cabinet.

(11) A method for controlling operation of a signal switching apparatus, the signal switching apparatus including multiple video image processing units each including a main circuit block, a sub-circuit block, and one or more keyer circuit blocks, a video input unit, a video selection unit configured to select a predetermined video signal from among multiple video signals inputted to the video input unit and to input the predetermined video signal to the video image processing units, and a video output unit configured to output video signals processed in the video image processing units, the method including controlling the video image processing units so that the video image processing units operate in an HD mode or quartering-4K mode.

It should be understood by those skilled in the art that various modifications, combinations, sub-combinations and alterations may occur depending on design requirements and other factors insofar as they are within the scope of the appended claims or the equivalents thereof.

What is claimed is:

1. A signal switching apparatus comprising:

a plurality of video image processing circuits including at least first circuitry configured to process a HD video frame and second circuitry configured to process quarter video frames obtained by quartering a 4K video frame;

a control circuit configured to control operation of the video image processing circuits; and a graphical user interface (GUI) configured to receive input of a selection between an HD mode and a quartering-4K mode which are operation modes of the video image processing circuits, wherein the control circuit is configured to control the video image processing circuits so that the first circuitry processes the HD video frame in a case that the GUI receives input of a selection of the HD mode, and the second circuitry processes the quarter video frames in a case that the GUI receives input of a selection of the quartering-4K mode, the control circuit is configured to determine whether a current signal format is 1080P, only in a case that the control circuit determines the current signal format is 1080P, the control circuit controls the GUI to enable a button to receive the input of the selection of the quartering-4K mode, and in a case that the control circuit determines the current signal format is not 1080P, the control circuit controls the GUI to disable the button to receive the input of the selection of the quartering-4K mode, the GUI is configured to receive input of a selection between a square division standard and a 2-sample interleave division standard which are both the quartering-4K mode, the second circuitry is configured to generate a first key signal having a shape of a quarter of a shape obtained by enlarging a wipe shape of the HD video frame horizontally and vertically twice for signals of the square division standard, and the second circuitry is configured to generate a second key signal having a shape identical to the wipe shape of the HD video frame for signals of the 2-sample interleave division standard.

2. The signal switching apparatus according to claim 1, wherein the control circuit is configured to control the video image processing circuits so that the second circuitry processes the quarter video frame obtained by quartering the 4K video frame in accordance with the square division standard in a case that the GUI receives input of a selection of the square division standard, and the second circuitry processes the quarter video frame obtained by quartering the 4K video frame in accordance with the 2-sample interleave division standard in a case that the GUI receives input of a selection of the 2-sample interleave division standard.

3. A signal switching apparatus comprising:

a plurality of video image processing circuits including at least first circuitry configured to process a HD video frame and second circuitry configured to process quarter video frames obtained by quartering a 4K video frame, each of the first circuitry and the second circuitry including a main circuit block, a sub-circuit block, and one or more keyer circuit blocks;

a video input circuit;

a video selection circuit configured to select a predetermined video signal from among a plurality of video signals including the HD video frame and the quarter video frames obtained by quartering the 4K video frame inputted to the video input circuit and to input the predetermined video signal to the video image processing circuits;

a video output circuit configured to output video signals processed in the video image processing circuits;

a control circuit configured to control operation of the video image processing circuits; and a graphic user interface (GUI) configured to receive input of a selection between a HD mode and a quartering-4K mode as an operation mode of the video image processing circuits, wherein the control circuit is configured to control the video image processing circuits so that the first circuitry processes the HD video frame in a case that the video selection circuit selects the HD video frame as the predetermined video signal, and the second circuitry processes the quarter video frames in a case that the video selection circuit selects the 4K video frame as the predetermined video signal, the control circuit is configured to control the video image processing circuits so that the first circuitry processes the HD video frame in a case that the GUI receives input of a selection of the HD mode, and the second circuitry processes the quarter video frames in a case that the GUI receives input of a selection of the quartering-4K mode, the control circuit is configured to determine whether a current signal format is 1080P, only in a case that the control circuit determines the current signal format is 1080P, the control circuit controls the GUI to enable a button to receive the input of the selection of the quartering-4K mode, and in a case that the control circuit determines the current signal format is not 1080P, the control circuit controls the GUI to disable the button to receive the input of the selection of the quartering-4K mode, the GUI is configured to receive input of a selection between a square division standard and a 2-sample interleave division standard which are both the quartering-4K mode, the second circuitry is configured to generate a first key signal having a shape of a quarter of a shape obtained by enlarging a wipe shape of the HD video frame horizontally and vertically twice for signals of the square division standard, and the second circuitry is configured to generate a second key signal having a shape identical to the wipe shape of the HD video frame for signals of the 2-sample interleave division standard.

4. The signal switching apparatus according to claim 3, wherein while the video image processing circuits operate in a HD mode, the main circuit block and sub-circuit block of the first circuitry processes the HD video frame, and wherein while the video image processing circuits operate in a quartering-4K mode, the main circuit block and sub-circuit block of each video image processing circuit process the second circuitry processes the quarter video frames obtained by quartering the 4K video frame.

5. The signal switching apparatus according to claim 3, wherein while the video image processing circuits operate in a quartering-4K mode, at least one of the keyer circuit blocks is used exclusively by each of the main circuit block and the sub-circuit block of the second circuitry.

6. The signal switching apparatus according to claim 3, further comprising:

a first cabinet including the video image processing circuits including at least the first circuitry and the second circuitry, the video input circuit, the video selection circuit, and the video output circuit; and a second cabinet including the video image processing circuits including at least the first circuitry and the second circuitry, the video input circuit, the video selection circuit, and the video output circuit, wherein in a case that the signal switching apparatus operates in a quartering-4K mode, first and second quarter video frames of first to fourth quarter video frames obtained by quartering the 4K video frame are processed in the video image processing circuits included in the first cabinet, and third and fourth quarter video frames of first to fourth quarter video frames are processed in the video image processing circuits included in the second cabinet.

7. A method for controlling operation of a signal switching apparatus, the signal switching apparatus including a plurality of video image processing circuits including at least first circuitry configured to process a HD video frame and second circuitry configured to process quarter video frames obtained by quartering a 4K video frame, each of the first circuitry and the second circuitry including a main circuit block, a sub-circuit block, and one or more keyer circuit blocks, a video input circuit, a video selection circuit configured to select a predetermined video signal from among a plurality of video signals including the HD video frame and the quarter video frames obtained by quartering the 4K video frame inputted to the video input circuit and to input the predetermined video signal to the video image processing circuits, a video output circuit configured to output video signals processed in the video image processing circuits, and a graphic user interface (GUI) configured to receive input of a selection between a HD mode and a quartering-4K mode as an operation mode of the video image processing circuits, the method comprising:

controlling the video image processing circuits so that the first circuitry processes the HD video frame in a case that the video selection circuit selects the HD video frame as the predetermined video signal, and the second circuitry processes the quarter video frames in a case that the video selection circuit selects the 4K video frame as the predetermined video signal;

determining whether a current signal format is 1080P;

only in a case that the determining determines the current signal format is 1080P, controlling the GUI to enable a button to receive the input of the selection of the quartering-4K mode, and in a case that the determining determines the current signal format is not 1080P, controlling the GUI to disable the button to receive the input of the selection of the quartering-4K mode;

receiving input of a selection between a square division standard and a 2-sample interleave division standard which are both the quartering-4K mode;

generating, using the second circuitry, a first key signal having a shape of a quarter of a shape obtained by enlarging a wipe shape of the HD video frame horizontally and vertically twice for signals of the square division standard; and generating, using the second circuitry, a second key signal having a shape identical to the wipe shape of the HD video frame for signals of the 2-sample interleave division standard.

* * * * *